Figure 1:
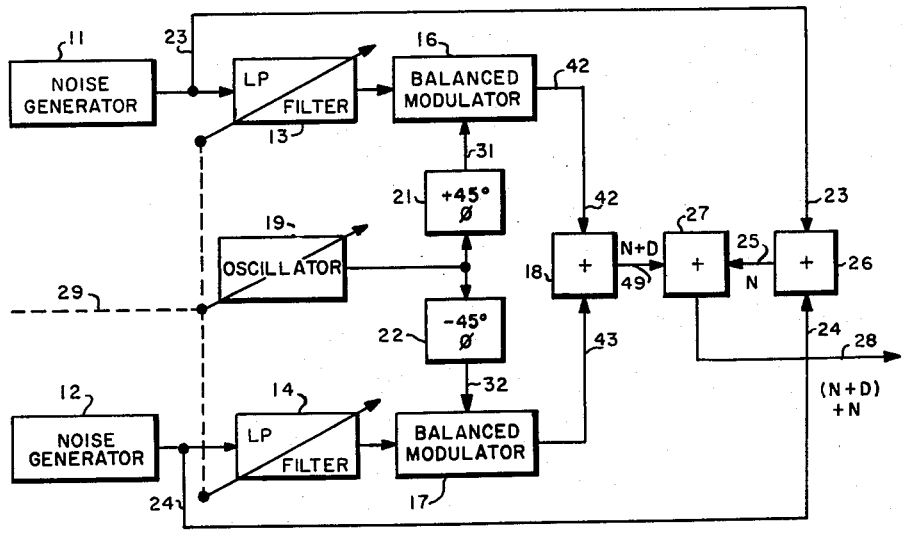

Sept. 20, 1960    L. I. GOLDFISCHER    2,953,780
DOPPLER SIMULATOR
Filed April 9, 1959

*INVENTOR.*
LESTER I. GOLDFISCHER

BY

ATTORNEY

United States Patent Office 2,953,780
Patented Sept. 20, 1960

2,953,780

DOPPLER SIMULATOR

Lester I. Goldfischer, New Rochelle, N.Y., assignor to General Precision Inc., a corporation of Delaware Filed Apr. 9, 1959, Ser. No. 805,329

10 Claims. (Cl. 343—17.7)

This invention relates to Doppler signal simulators. More specifically, it relates to test instruments having a frequency spectrum output simulating the output of a Doppler microwave receiver.

One form of Doppler microwave instrument is employed on aircraft to measure the aircraft ground track speed, and is used to compute present position by dead reckoning. Such an instrument beams a microwave ray obliquely forward and toward the earth and receives from the scattered and reflected energy a signal having an increased microwave frequency because of the Doppler effect, from which the speed can be computed. The transmitted beam is generally scattered at the earth's surface in such a way that the reflected energy, received at the aircraft is, at any instant, random in amplitude within wide limits and completely random in phase. The amount by which the received microwave frequency is greater than the single transmitted frequency is termed the Doppler difference. This Doppler difference contains, not a single frequency, but a spectrum of frequencies having a width of perhaps fifteen percent of its central frequency and having, to a first approximation, a Gaussian frequency distribution.

The Doppler receiver demodulates the received microwave signal containing the Doppler information, and generally emits a signal consisting of a spectrum of frequencies with Gaussian distribution having a center frequency between zero and perhaps 30,000 cycles per second, the frequencies of this spectrum being equal to those of the Doppler difference spectrum. The receiver output signal spectrum is contaminated with noise and is superimposed on a noise background which is continuous and constant in the frequency domain. Accurate simulation requires the imitation of this signal in all of its significant aspects.

The prior art method of simulation employs a sinusoidal generator of a carrier at the desired spectrum central frequency. It also employs a noise generator followed by a low-pass filter, the output as shaped by the filter cutoff being generally like the positive half of a Gaussian distribution curve. The carrier is modulated by the noise to form two sidebands having together an approximately Gaussian shape centered at the carrier frequency.

On the oscilloscope and by most tests this signal perfectly simulates the microwave receiver Doppler spectrum except for the noise background, which can easily be added. There is, however, one important difference; the phases are not completely random, for the upper and lower noise sidebands are mirror images of each other. In fact, if the axis crossings of the spectrum be examined, it will be found that they coincide in time with the axis crossings of the carrier. Therefore if the average frequency of the spectrum be measured by an axis-crossing type of frequency tracker and by a resonant type of tracker, the two measurements will not necessarily agree. The axis-crossing measurement must necessarily give the carrier frequency, while the resonant tracker measurement gives the same result only when the spectrum is symmetrical. Since exact symmetry need not be attained in the simulator and is not generally found in the received microwave signal, prior art simulators are seriously deficient in this respect.

The simulator of the present invention overcomes this deficiency by generating a noise-like spectrum having its phase at any instant completely random, and having a frequency characteristic in which the upper and lower sidebands are not mirror images of each other. The simulator accomplishes this by generating two noise spectra. Each noise spectra modulates one of a pair of carrier signals, the two carriers having the same frequency but having their phases in quadrature relation. The two resultant frequency-transformed spectra are then added to form a single spectrum random in both amplitude and phase. This can be superimposed on a noise background to form a more nearly exact simulation of the actual Doppler spectrum as found at the output of the microwave Doppler navigational receiver.

The purpose of this invention is to provide means for generating a frequency spectrum which simulates in all respects a microwave Doppler receiver spectrum.

Figure 2:
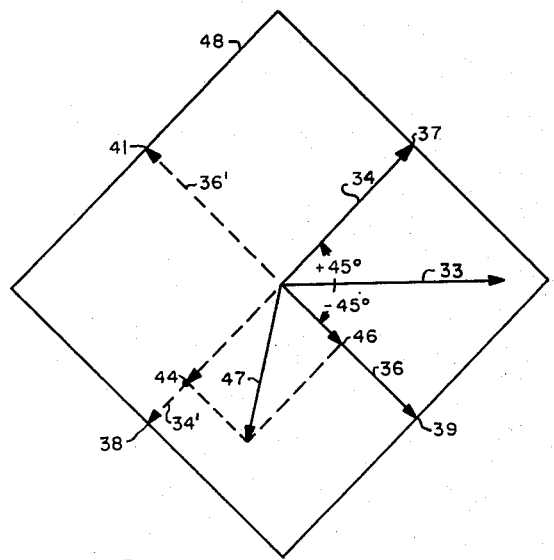

A further understanding of this invention may be secured by reference to the detailed description and associated drawings, in which Figure 1 is a block diagram of an embodiment of the invention and Figure 2 is a vector diagram illustrating the operation of the invention.

Referring now to Fig. 1, two noise generators 11 and 12 generate similar wideband noise spectra, each having a flat frequency distribution extending down to zero. The output of each noise generator is applied to its respective low-pass adjustable filter 13 and 14, of simple form. The two filters have identical transmission characteristics which are maximum at or very near zero frequency and fall off in accordance with a function which is reasonably close to the positive half of a Gaussian function. The output of each filter is applied to its respective balanced modulator 16 and 17, and the outputs of the modulators are added in an adding circuit 18.

The two modulators 16 and 17 are identical. It is preferable that their design be balanced so that neither input appears in the output. The modulating signals are derived from an adjustable sine wave oscillator 19 through phase-changing instrumentation so arranged that although the frequencies of the signals applied to the modulators 16 and 17 are identical, their phases differ by 90°. One way in which this may be done is to provide a +45° phase shifter 21 connected between oscillator 19 and modulator 16, and a second 45° phase shifter 22, differing in that the phase shift is negative, connected between the oscillator 19 and the modulator 17. Alternatively the oscillator 19 may be connected directly to the modulator 17 and connected through a 90° phase shifter to modulator 16. This phase shifter can either advance or retard the phase. It is advisable in all cases to insert gain control circuits or otherwise insure that equal heterodyning signal amplitudes are applied to the modulators 16 and 17 over the entire frequency range of interest.

An additional output is taken from one or both noise generators before the filters and is added to the output signal to provide the noise background flat over the entire range of frequencies of interest. For example, noise signals are applied through conductors 23 and 24 to an adding circuit 26 the output of which is imposed on conductor 25. This may be termed the noise background output. The output of adder 18 may be termed the Doppler-plus-noise spectrum output. These two outputs are added in a third adding circuit 27, providing at the final output conductor 28 a Gaussian Doppler-plus-noise spectrum superimposed on a flat noise base.

It is desirable to be able to adjust this instrument over the entire range of Doppler frequencies for which the system under test is designed. Consequently, the oscillator 19 should be adjustable over this range. It is also desirable to maintain the simulated Doppler spectrum width at a constant fraction of its center frequency in order to imitate the actual Doppler spectrum in this respect. Consequently the filters 13 and 14 are made adjustable in bandwidth and their adjustments are connected to the oscillator adjustment so that the three can be changed in concert. The filter bandwidths can thus be increased linearly with increase in oscillator frequency. This conjoint adjustment is indicated by the dashed line 29.

In the operation of the simulator circuit, the phase relations of the output of oscillator 19 with respect to the phase-shifted outputs applied at conductors 31 and 32 are shown in Fig. 2. The oscillator 19 output voltage is represented by the vector 33 having a direction representing the voltage phase. Vector 34 represents the output voltage of phase shifter 21 and is advanced by +45° with regard to vector 33. Similarly, vector 36 represents the output voltage of phase shifter 22 and is retarded by 45° as respects vector 33. Vectors 34 and 36 are thus in quadrature. After the +45° phase-shifted potential has been amplitude modulated by noise potential in modulator 16, it still has +45° phase shift but its amplitude may have any positive or negative value equalling the algebraic product of the noise and sine amplitude. In Fig. 2 let the vector 34 now represent the output quantity of modulator 16 when this quantity is positive, and let vector 34' represent the negative quantity. The maximum output amplitudes are represented by the vector arrowheads 37 and 38 and the instantaneous amplitude, being noise-dependent, is random between the limits 37 and 38. Alternatively, it could be said that the output of modulator 16 is represented by a vector 34 having maximum length 37 and a phase randomly positioned at +45° or +270°. Similarly, the amplitude and phase of the output of modulator 17 are shown by the vectors 36 and 36', and the instantaneous amplitude may have any value between those indicated by their ends 39 and 41.

When the output currents of modulators 16 and 17 in conductors 42 and 43 are added by adder 18, the operation is represented by the addition of the orthogonal vectors of Fig. 2. For example, if the vector 34' having a length extending to point 44 is to be added to the vector 6 having a length extending to point 46, the sum is the vector 47 having the length and phase as shown graphically in the figure. It is apparent that the vector sum can have any magnitude within the rectangle 48 and any phase angle between zero and 360°. Thus the output at conductor 49, Fig. 1, is a current or voltage which is random in amplitude within the limits extending from zero and the limit set by rectangle 48 and which is completely random in phase. It has a central frequency approximately equal to the frequency to which oscillator 19 is adjusted. The spectrum has a Gaussian form and a constant ratio of spectrum width to average frequency at all average frequencies.

The outputs of generators 11 and 12 are added in adder 26 to form a noise spectrum at conductor 25 which is flat from zero to the highest frequency of interest. This noise spectrum is in turn added in adder 27 to the Gaussian-shaped spectrum introduced from conductor 49, and the output in conductor 28 consists of a noise-like Gaussian-shaped simulated Doppler spectrum superimposed on a flat noise background.

What is claimed is:

1. A Doppler simulator comprising means generating carrier signal, noise generating means generating a pair of similarly shaped noise signal spectra extending substantially to zero frequency, said pair of similarly shaped noise spectra being mutually independent in amplitude and phase, means deriving a pair of signals of like frequency but in phase quadrature from said carrier signal, means modulating each one of said pair of signals with a respective one of said pair of similarly shaped independent noise signal spectra to form a pair of modulation products in mutual phase quadrature, and means adding said pair of modulation products to form an output signal spectrum having random amplitude and phase.

2. A Doppler simulator in accordance with claim 1 including means for deriving a flat noise spectrum extending from substantially zero to the highest frequency to be simulated from said noise generating means, and means superimposing said output signal spectrum on said flat noise spectrum.

3. A Doppler simulator comprising, a carrier generator, a pair of noise generators, means shaping the output signals thereof to provide limited spectra extending to substantially zero frequency, a pair of modulators, means applying the output of said carrier generator to said pair of modulators in phase quadrature, means applying said shaped output noise signals to said modulators respectively, and means adding said modulator outputs.

4. A Doppler simulator comprising, a carrier generator having substantially a single-frequency output, a pair of noise generators, means limiting the outputs thereof to similar bands extending between zero and a selected low frequency, a pair of balanced modulator means having said carrier generator output impressed thereon and producing therefrom a pair of output signals having the carrier frequency but having phases differing by 90°, means applying each of said pair of output signals to respective ones of said pair of balanced modulators whereby two modulator output spectra mutually at phase quadrature are formed, and means adding said two modulator output spectra to form a noise spectrum having random phase and amplitude.

5. A Doppler simulator comprising, a pair of flat noise generators, a pair of low-pass filters transmitting the respective outputs of said pair of noise generators, a pair of modulators, means applying the outputs of the pair of low-pass filters to respective ones of said pair of modulators, a carrier generator, a phase shifter excited from said carrier generator having a pair of outputs in phase quadrature, means applying the pair of outputs of said phase shifter to respective ones of said pair of modulators, and an adding circuit for adding the outputs of said pair of modulators.

6. A Doppler simulator in accordance with claim 5 including a second adding circuit having a flat noise spectrum from at least one of said pair of flat noise generators and the output of said first mentioned adding circuit applied thereto.

7. A Doppler simulator comprising, a pair of generators generating wideband flat noise extending down to substantially zero frequency, a pair of adjustable-width low-pass filters transmitting the respective outputs of said pair of generators, a pair of balanced modulators, means applying the outputs of said pair of low-pass filters to respective ones of said balanced modulators, an adjustable carrier generator, a phase shifter excited therefrom having a pair of outputs in phase quadrature, means applying said pair of phase quadrature outputs to respective ones of said pair of balanced modulators whereby a pair of modulation product spectra in mutual phase quadrature is secured therefrom, an adding circuit and means applying the modulation product spectra outputs of said pair of balanced modulators to said adding circuit whereby the adding circuit output sum spectrum has random amplitude and random phase.

8. A Doppler simulator in accordance with claim 7, including a second adding circuit, means applying thereto the outputs of said pair of generators to form a flat noise output, a third adding circuit and means applying thereto the flat noise output of said second adding circuit and the random amplitude and random phase sum spectrum of said first mentioned adding circuit whereby the output of the third adding circuit consists of a simulated Doppler spectrum superimposed on a flat noise spectrum.

9. A Doppler simulator comprising, a pair of flat wideband noise generators, said generators generating independent and unrelated noise spectra extending from substantially zero frequency to at least several thousand cycles per second, a pair of similar, adjustable-width, low-pass filters having similar transmission characteristics resembling in frequency distribution the positive half of a Gaussian characteristic, means applying the respective outputs of said noise generators to said filters, a pair of balanced modulators, means applying the respective outputs of said filters to said modulators, a carrier generator generating a sinusoidal, single-frequency carrier signal, said generator being adjustable over the range of frequencies of Doppler signals to be simulated by said Doppler simulator, unicontrolled adjusting means for said carrier generator and said pair of filters, and a phase shifter having two outputs in phase quadrature, means applying thereto the output carrier signal of said carrier generator, means applying the two outputs of said phase shifter to respective ones of said pair of balanced modulators, an adding circuit, and means applying the outputs of said pair of balanced modulators to said adding circuit whereby the sum output consists of a simulated Doppler spectrum having noise characteristics and is random in both amplitude and phase.

10. A Doppler simulator in accordance with claim 9 including a second adding circuit, means applying thereto the outputs of said pair of generators to form a flat noise output, a third adding circuit and means applying thereto the flat noise output of said second adding circuit and the random amplitude and random phase sum spectrum of said first mentioned adding circuit whereby the output of the third adding circuit consists of a simulated Doppler spectrum superimposed on a flat noise spectrum.

References Cited in the file of this patent
UNITED STATES PATENTS
2,476,337    Varian _____ July 19, 1949